United States Patent
Hatta et al.

(10) Patent No.: US 8,185,775 B2
(45) Date of Patent: May 22, 2012

(54) VIRTUAL COMPUTER SYSTEM AND CONTROL METHOD THEREOF

(75) Inventors: Yukari Hatta, Hadano (JP); Hitoshi Ueno, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 44 days.

(21) Appl. No.: 12/894,690

(22) Filed: Sep. 30, 2010

(65) Prior Publication Data

US 2011/0022887 A1    Jan. 27, 2011

Related U.S. Application Data (63) Continuation of application No. 12/129,294, filed on May 29, 2008, now Pat. No. 7,814,363.

(30) Foreign Application Priority Data

May 30, 2007    (JP) ................................ 2007-143633

(51) Int. Cl.
G06F 11/00    (2006.01)
(52) U.S. Cl. .......................................... 714/3; 714/5.11
(58) Field of Classification Search .................. 714/3, 4, 714/4.11, 4.5, 5.1, 5.11, 6.1, 6.11–6.13, 6.2, 714/6.21, 6.31, 6.32
See application file for complete search history.

(56) References Cited

U.S. PATENT DOCUMENTS

| 5,437,016 A | 7/1995 | Ikegaya et al. |
|---|---|---|
| 6,598,174 B1 | 7/2003 | Parks et al. |
| 7,814,363 B2 * | 10/2010 | Hatta et al. ................. 714/3 |
| 7,992,032 B2 * | 8/2011 | Baba et al. ................. 714/3 |
| 2004/0068561 A1 | 4/2004 | Yamamoto et al. |
| 2004/0194086 A1 | 9/2004 | Suzaki |
| 2005/0172040 A1 | 8/2005 | Hashimoto |
| 2005/0240800 A1 | 10/2005 | Hashimoto |
| 2005/0268298 A1 | 12/2005 | Hunt et al. |
| 2006/0031594 A1 | 2/2006 | Kodama |
| 2006/0036832 A1 | 2/2006 | Makiyama |
| 2006/0095700 A1 | 5/2006 | Sato et al. |

FOREIGN PATENT DOCUMENTS

| JP | 10-283210 | 10/1998 |
|---|---|---|
| JP | 2005-327279 | 11/2005 |
| JP | 2007-094611 | 4/2007 |

* cited by examiner

*Primary Examiner* — Dieu-Minh Le
(74) *Attorney, Agent, or Firm* — Mattingly & Malur, PC

(57) ABSTRACT

When a failure occurs in an LPAR on a physical computer under an SAN environment, a destination LPAR is set in another physical computer to enable migrating of the LPAR and setting change of a security function on the RAID apparatus side is not necessary. When a failure occurs in an LPAR generated on a physical computer under an SAN environment, configuration information including a unique ID (WWN) of the LPAR where the failure occurs is read, a destination LPAR is generated on another physical computer, and the read configuration information of the LPAR is set to the destination LPAR, thereby enabling migrating of the LPAR when the failure occurs, under the control of a management server.

8 Claims, 13 Drawing Sheets

| 1201 | 1202 | 1203 | 1204 | 1205 | 1206 | 1207 | 1208 | 1209 | 1210 |
|---|---|---|---|---|---|---|---|---|---|
| SERVER MODULE NUMBER | ARCHITECTURE TYPE | MOUNTED-MEMORY CAPACITY | TOTAL MEMORY UTILIZATION OF ACTIVE LPARS | MEMORY FREE SPACE | MOUNTED-CPU PERFORMANCE | TOTAL PERFORMANCES OF ASSIGNED-CPUS | PERFORMANCE OF AVAILABLE CPU | THE NUMBER OF AVAILABLE NICS | THE NUMBER OF AVAILABLE HBAS |
| | | | | | | | | | |
| | | | | | | | | | |

107

VIRTUAL COMPUTER SYSTEM AND CONTROL METHOD THEREOF

CROSS-REFERENCES

This application is a continuation application of U.S. Ser. No. 12/129,294, filed May 29, 2008, the entire disclosure of which is hereby incorporated by reference.

BACKGROUND OF THE INVENTION

The present invention relates to a virtual computer system, and particularly to a virtual computer system and a control method of migrating a logical partition by which, when a failure occurs in the logical partition on a physical computer, a substitute for the logical partition is generated on another physical computer to migrate a process of the logical partition.

There has been put to practical use a virtual computer system in which plural logical computers or logical partitions (hereinafter, referred to as LPARs) are established on a physical computer and OSs (operating systems) are allowed to operate on the respective logical computers, thereby allowing the unique OSs to operate on the plural logical computers. Further, as a recent example of the virtual computer system, the virtual computer system in which a logical FC (Fibre Channel) extension board or a logical FC port is mounted to each virtual computer is used under an SAN (Storage Area Network) environment including an RAID (Redundant Array of Inexpensive Disks) apparatus.

In the computer system to realize booting under the SAN environment, in order to protect data of logical units in the RAID apparatus in which OSs are installed, a security function by which an access is permitted only from the respective computers is realized by the RAID apparatus. The security function generally utilizes a method in which, by using unique IDs (World Wide Names) assigned to the FC ports mounted on the respective computers, the logical units having the OSs installed are associated with the unique IDs (World Wide Names) assigned to the FC ports provided for the computers and an access is permitted only from the FC ports having the IDs (World Wide Names). Further, the IDs (World Wide Names) unique to the apparatuses are recorded in software including OSs in some cases.

In a redundant configuration of the computer system to perform booting from the SAN, the unique IDs (World Wide Names) assigned to the FC ports are different depending on an actually-used computer and a standby computer. Accordingly, when the actually-used computer is migrated to the standby computer, a software image including an OS cannot be used as it is, and it is necessary to change setting of the security function on the RAID apparatus side by SAN management software or a system administrator. The setting change is required not only between the physical computers such as the actually-used computer and the standby computer, but also between the LPARs in the virtual computer system. Specifically, even when plural LPARs are allowed to operate on the physical computers in the virtual computer system and an actually-used LPAR is migrated to a standby LPAR, it is necessary to change the setting of the security function on the RAID apparatus side due to difference of the unique IDs (World Wide Names) assigned to the logical FC ports of the respective LPARs.

For example, JP-A 2005-327279 and H10-283210 disclose a technique in which, in a virtual computer system where LPARs can be established on plural physical computers, configuration information of the LPAR is migrated from the LPAR of one physical computer to another physical computer to take over its operation.

SUMMARY OF THE INVENTION

JP-A 2005-327279 and H10-283210 do not disclose migrating of the LPAR by which when a failure occurs in the LPAR of the physical computer, another LPAR generated in another physical computer is used as a standby LPAR.

Further, JP-A 2005-327279 and H10-283210 do not disclose taking over of the unique ID (World Wide Name) assigned to the logical FC port of the LPAR because the setting change of the security function on the RAID apparatus side is unnecessary when one LPAR is migrated to another in the virtual computer system under the SAN environment.

An object of the present invention is to provide a virtual computer system in which when a failure occurs in an LPAR on a physical computer under an SAN environment, a destination LPAR is set in another physical computer to enable migrating of the LPAR without necessity of setting change of a security function on the RAID apparatus side.

According to the present invention, there is preferably provided a virtual computer system having plural physical computers including first and second physical computers and a management apparatus that is connected to the plural physical computers via a network to manage the physical computers and logical partitions, and allows OSs to operate by generating the logical partitions on the physical computers, wherein the first physical computer includes: failure detection means for detecting that a failure occurs in the first physical computer or a first logical partition formed in the first physical computer; and first management means for managing hardware configuration information of the first physical computer and unique configuration information assigned to the first logical partition, the management apparatus includes: means for accepting notification of the failure occurrence from the failure detection means to receive the hardware configuration information and the unique configuration information from the first management means; and means for determining the substitute second physical computer to transmit the hardware configuration information and the unique configuration information to the second physical computer, and the second physical computer includes: means for receiving the hardware configuration information and the unique configuration information transmitted from the management apparatus; means for determining whether or not a second logical partition can be generated on the second physical computer on the basis of the hardware configuration information and the unique configuration information; and means for generating the second logical partition on the basis of the unique configuration information when the determination means determines that the second logical partition can be generated.

According to the present invention, when a failure occurs in the LPAR on the physical computer under the SAN environment, the destination LPAR is set in another physical computer so as to enable migrating of the LPAR without necessity of setting change of the security function on the RAID apparatus side. Further, configuration information and the like of the original LPAR are migrated to the destination LPAR under the control of the management server, so that even when a failure occurs in the original physical computer, migrating of the LPAR can be realized.

DESCRIPTION OF PREFERRED EMBODIMENTS

Hereinafter, an embodiment will be described with reference to the drawings.

Figure 1:
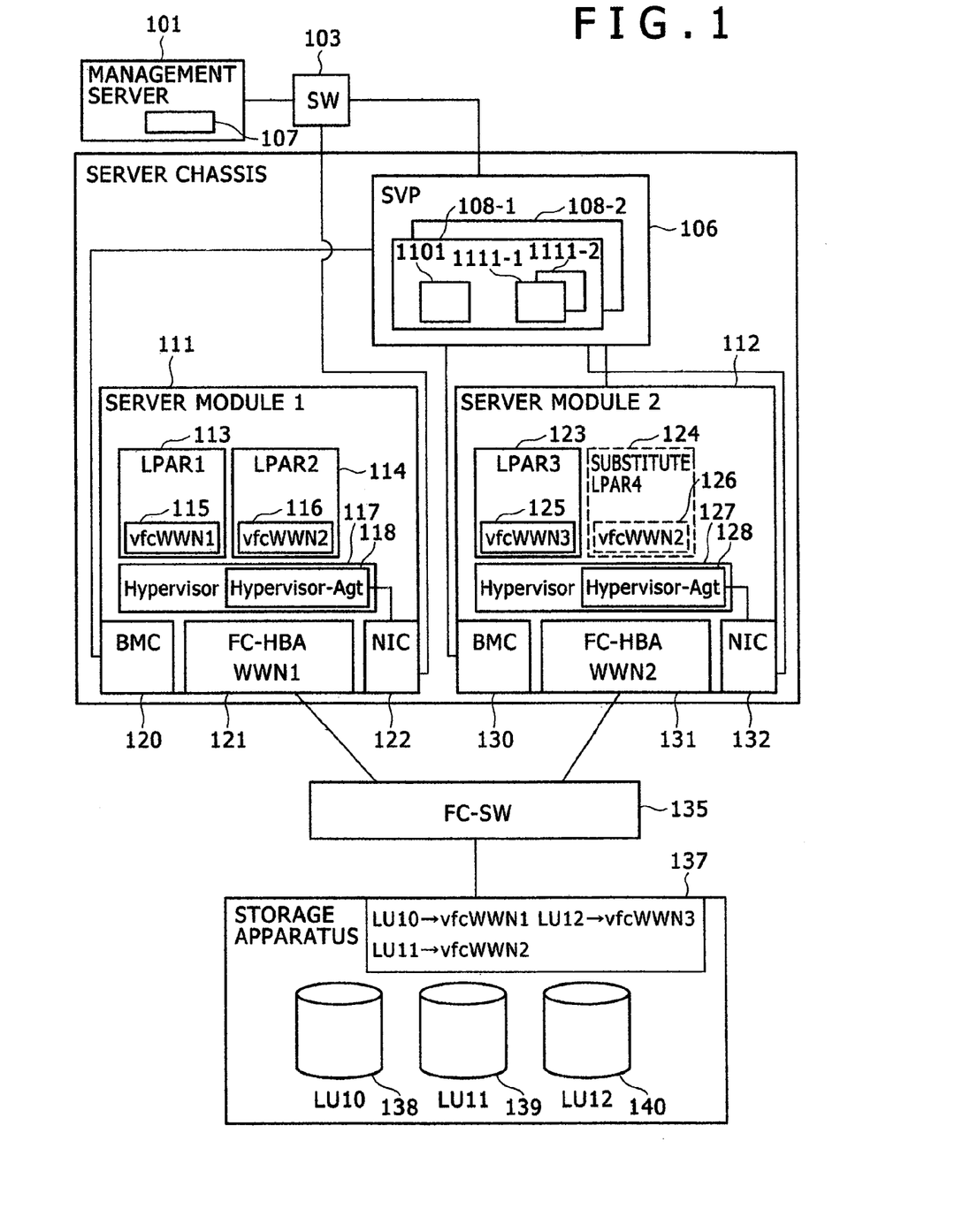
FIG. 1 is a view showing a configuration of a computer system according to an embodiment.

Referring to FIG. 1, a computer system according to an embodiment has a configuration of a blade server in which plural server modules (hereinafter, simply referred to as servers) 111 and 112 can be mounted in a server chassis 105. A service processor (SVP) 106 is mounted in the server chassis 105.

The servers 111 and 112 are connected to a management server 101 through NICs (Network Interface Cards) 122 and 132 via a network SW 103, respectively, and connected to a storage apparatus 137 through FC-HBAs (Fibre Channel Host Bus Adapters) 121 and 131 via a fibre channel switch (FC-SW) 135, respectively.

The servers 111 and 112 basically have the same configuration and include BMCs (Base Management Controllers) 120 and 130, the FC-HBAs 121 and 131, and the NICs 122 and 132, respectively. Each of hypervisors 117 and 127 is a virtual mechanism by which physically one server logically appears to be plural servers.

In the server 111, two LPARs 113 and 114 simulated on the hypervisor 117 are established and operated. Each of Hypervisor-Agts 118 and 128 in the hypervisors 117 and 127 is an agent which detects a failure of the LPARs and notifies the management server 101 of the failure.

An LPAR 123 is operated in the server 112 in the embodiment, and a destination LPAR4 (124) of the LPAR2 (114) in the server 111 is set later.

In order to establish communications, each of the FC-HBAs 121 and 131 has one WWN for each FC connection port as an HBA address. The LPARs 113 and 114 are provided with logical HBA ports 115 and 116, respectively, and the ports are given unique WWNs (World Wide Names) such as vfcWWN1 (115) and vfcWWN2 (116), respectively. Each logical HBA also has the same WWN as the physical HBA. It should be noted that the LPAR3 (123) in the server 112 is also similarly given a unique WWN.

The storage apparatus 137 has plural disk units 138 to 140 called LUs (logical units) which are logically specified. Connection information indicating association of the LUs with the servers is managed by a controller in the storage apparatus 137. For example, the LU10 (138) is connected to the LPAR 113 having the vfcWWN1 (115) as the WWN, and the LU11 (139) is connected to the LPAR 114 having the vfcWWN2 (116) as the WWN. A function for setting the connection relation is called an LUN security setting function.

The SPV 106 manages all the servers in the server chassis, and performs power source control and a failure process of the servers. In order to manage the servers, hardware configuration information 1101 (see FIG. 11) of the server and hypervisor configuration information 1111 (see FIG. 12) are stored into a nonvolatile memory (not shown) in the SVP for management. The configuration information 1101 and 1111 are managed for each server, and the SVP has two-screen configuration information 108-1 and 108-2 corresponding to the servers 111 and 112, respectively, in the example illustrated in FIG. 1. Further, the hypervisor configuration information 1111 includes information corresponding to the hypervisors 117 and 127 of the servers 111 and 112.

The management server 101 manages the servers 111 and 112 and the LPARs formed in the servers. Therefore, management information 107 (see FIG. 13) of the servers is stored into a memory (not shown) for management. In the embodiment, a function of managing migrating of the LPAR is also provided.

Next, contents of the respective management information will be described with reference to FIGS. 11 to 13.

Figure 11:
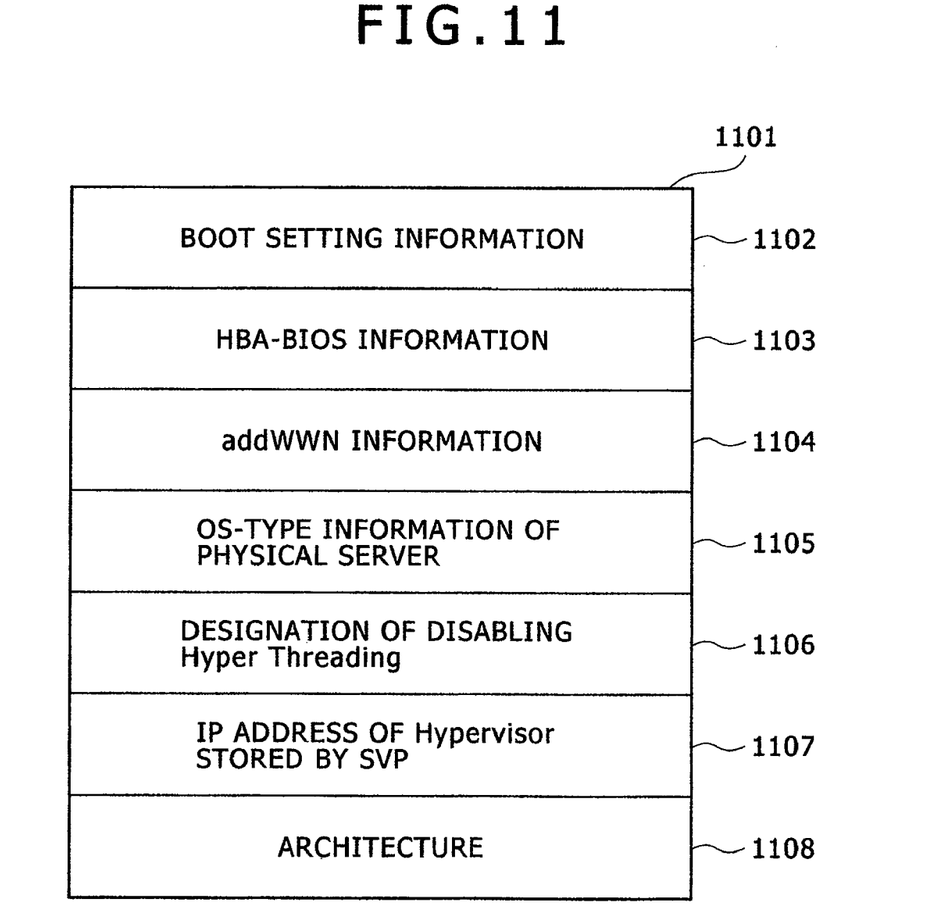
FIG. 11 is a view showing contents of hardware configuration information 1101 of a server.

As shown in FIG. 11, the hardware configuration information (occasionally referred to as server module/hardware configuration information) 1101 of the server holds physical server information such as boot setting information 1102, HBA-BIOS information 1103, addWWN information 1104, OS-type information of physical server 1105, designation of disabling hyper threading 1106, an IP address of hypervisor stored by SVP 1107, and an architecture 1108. The hardware configuration information 1101 is present for each server module (partition).

Figure 12:
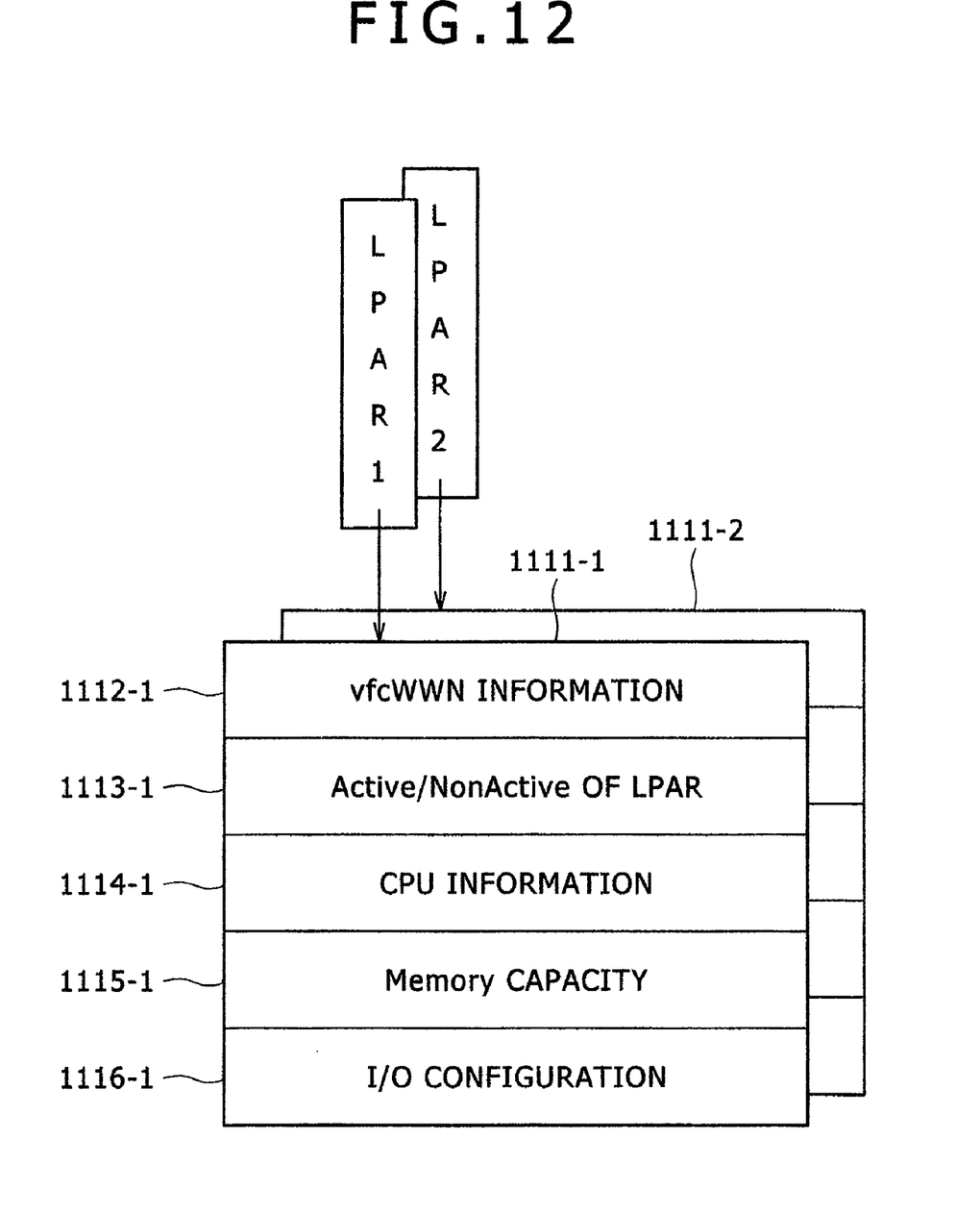
FIG. 12 is a view showing contents of hypervisor configuration information 1111.

As shown in FIG. 12, the hypervisor configuration information 1111 is information managed for each LPAR in the partitions, and is present for each of the LPARs 113 and 114 (illustrated by using 1111-1 and 1111-2). Each hypervisor configuration information 1111 holds information such as vfcWWN information (1112-1), Active/NonActive (1113-1) indicating whether or not the LPAR is being active, CPU information (1114-1) including the number of CPUs and the like, a memory capacity (1115-1), and an I/O configuration (1116-1) including the HBA, NIC and the like.

Although the hardware configuration information 1101 of the server and the hypervisor configuration information 1111 are set and managed by the SVP 106, these pieces of information are held by each hypervisor operated on the servers.

Figure 13:
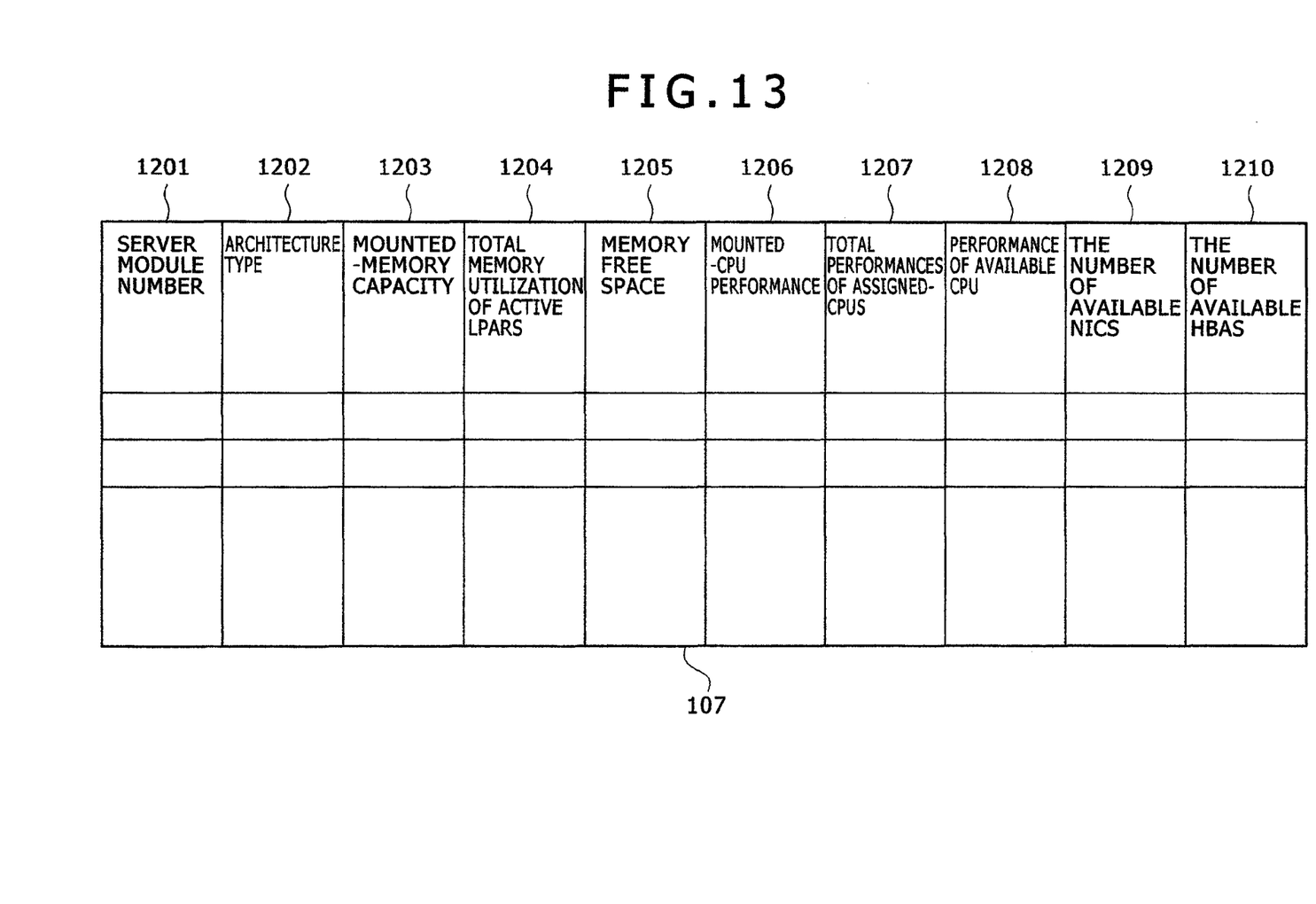
FIG. 13 is a view showing contents of management information 107 of the server.

As shown in FIG. 13, the management information (occasionally referred to as server module management information) 107 of the servers managed by the management server 101 holds information such as a server module number 1201, an architecture type of hardware 1202, a mounted-memory capacity 1203, a total memory utilization of active LPARs 1204, a memory free space 1205, a mounted-CPU performance 1206, total performances of assigned-CPUs 1207, an available CPU performance 1208, the number of available NICs 1209, and the number of available HBAs 1210.

According to the embodiment, when a failure occurs in the LPAR of the server 111, the management server 101 that receives the failure notification sets the destination LPAR4

(124) in the server 112 and controls to allow the LPAR4 (124) to take over the configuration information unique to the LPAR where the failure occurs.

Figure 2:
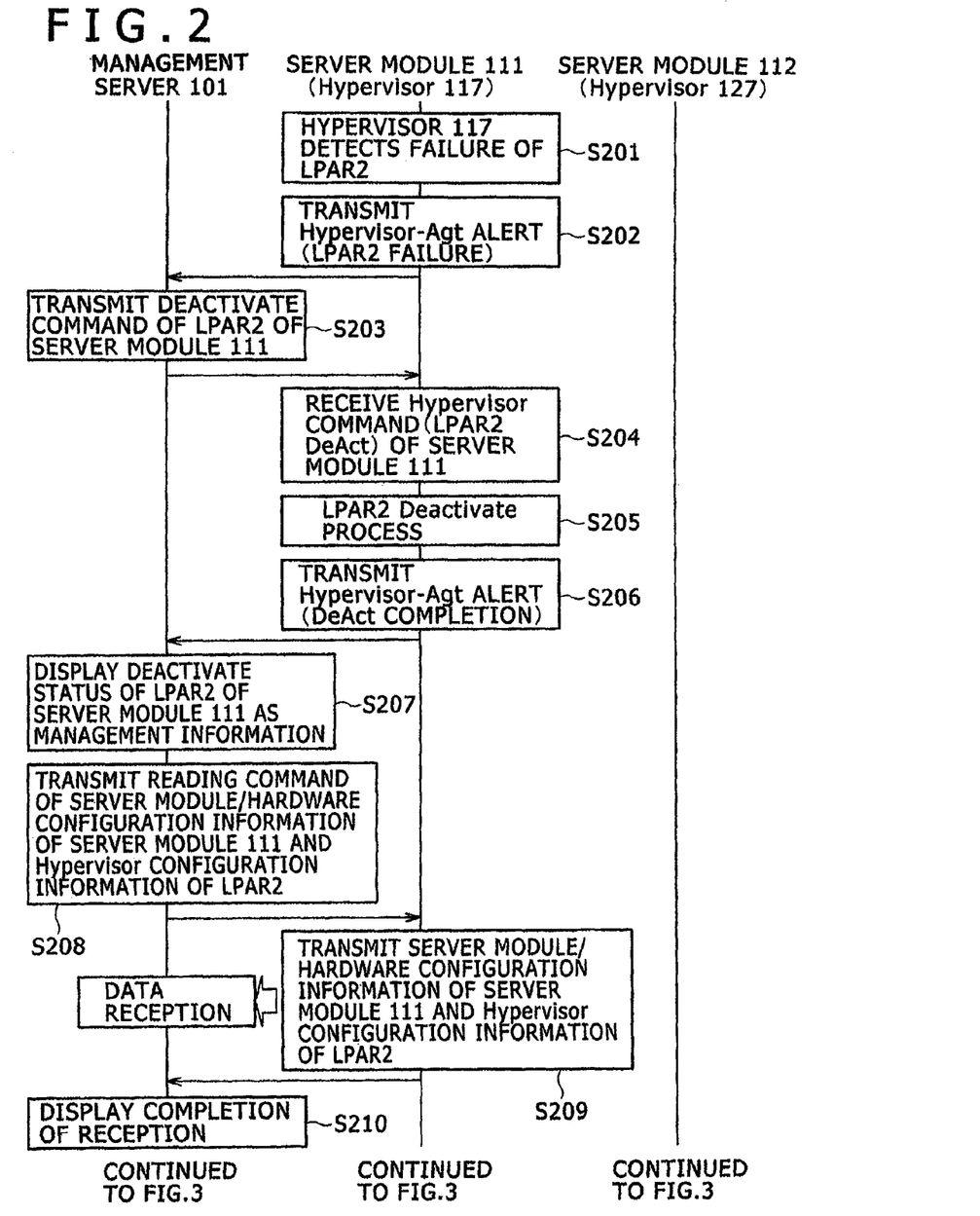
FIG. 2 is a flowchart showing a process performed when a failure occurs.
Figure 3:
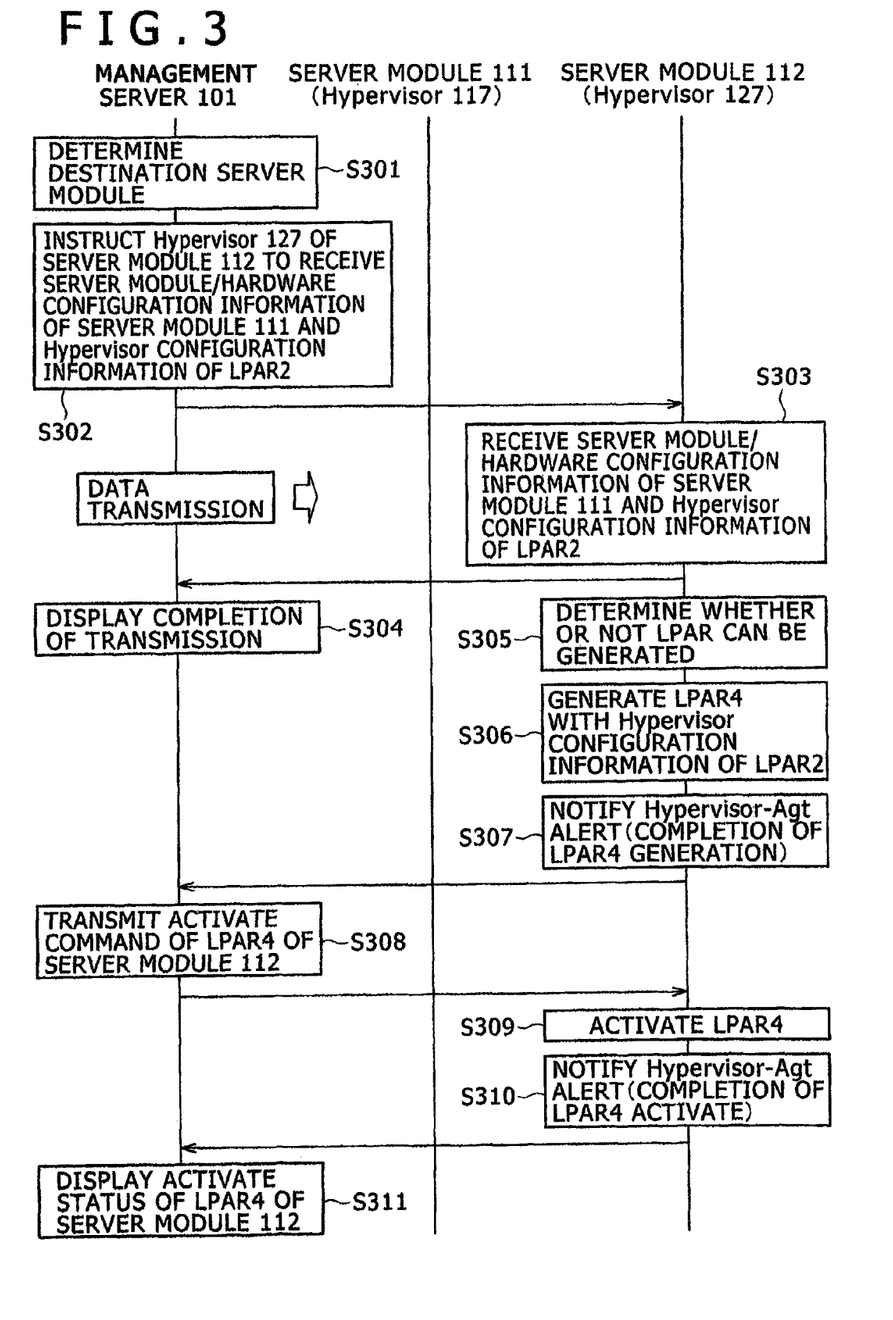
FIG. 3 is a flowchart showing a process performed when a failure occurs.

Hereinafter, a setting process of the destination LPAR and a takeover process of the configuration information unique to the LPAR when a failure occurs in the LPAR in the server 111 will be described in detail with reference to FIGS. 2 and 3. The example illustrated in FIGS. 2 and 3 shows processing operations performed by the management server 101, the hypervisor 117 of the server 111, and the hypervisor 127 of the server module 112 when a failure occurs in the LPAR2 (114) of the server 111.

When a failure occurs in the LPAR2 (114) and the hypervisor 117 operated in the server 111 detects the failure (S201), the hypervisor 117 transmits a failure notification (Hypervisor-Agt alert) to the management server 101 (S202). The management server 101 transmits a deactivate command so as to deactivate the LPAR2 where the failure occurs (S203). After receiving the LPAR deactivate command, the hypervisor 117 performs deactivation (a deactivate process) of the LPAR2 (S205). When the deactivate process is completed, the hypervisor 117 transmits the Hypervisor-Agt alert to the management server 101 to notify the same of the completion of deactivate (S206).

The management server 101 which receives the Hypervisor-Agt alert displays a deactivate status of the LPAR where the failure occurs on a display unit as management information (S207), and transmits a configuration information reading command of the LPAR2 (S208).

The hypervisor 117 which receives the command transmits the server module/hardware configuration information and the hypervisor configuration information of the LPAR2 held by the hypervisor 117 to the management server 101 (S209).

When completing the reception of the data, the management server 101 displays the completion of reception (S210). Thereafter, the management server 101 determines a destination server module (S301). For example, the management server 101 instructs the hypervisor 127, which is supposed to generate the LPAR on the destination server module 112, to receive the server module/hardware configuration information of the server module 111 where the failure occurs and the hypervisor configuration information of the LPAR2 (S302).

When receiving the configuration information relating to the LPAR2 where the failure occurs (S303), the hypervisor 127 determines whether or not the LPAR can be generated in the destination server module on the basis of the configuration information (S305). The determination will be described later in detail. If the result of the determination satisfies predetermined conditions, the LPAR which takes over the configuration information relating to the LPAR2 of the original server is generated in the destination server 112 (S306). In this example, the LPAR4 (124) serves as the LPAR of the destination server. When completing the generation of the LPAR4 (124), the hypervisor 127 transmits the Hypervisor-Agt alert and notifies the completion of generation of the LPAR (S307).

When receiving the Hypervisor-Agt alert, the management server 101 transmits an activate command to the hypervisor 127 so as to activate the generated LPAR4 (S308). The hypervisor 127 which receives the activate command activates the generated LPAR 124 (S309). Then, the hypervisor 127 transmits the Hypervisor-Agt alert and notifies the completion of activate of the LPAR 124 (S310). The management server 101 which receives the Hypervisor-Agt alert displays an activate status of the LPAR 124 on the display unit (S311).

Figure 4:
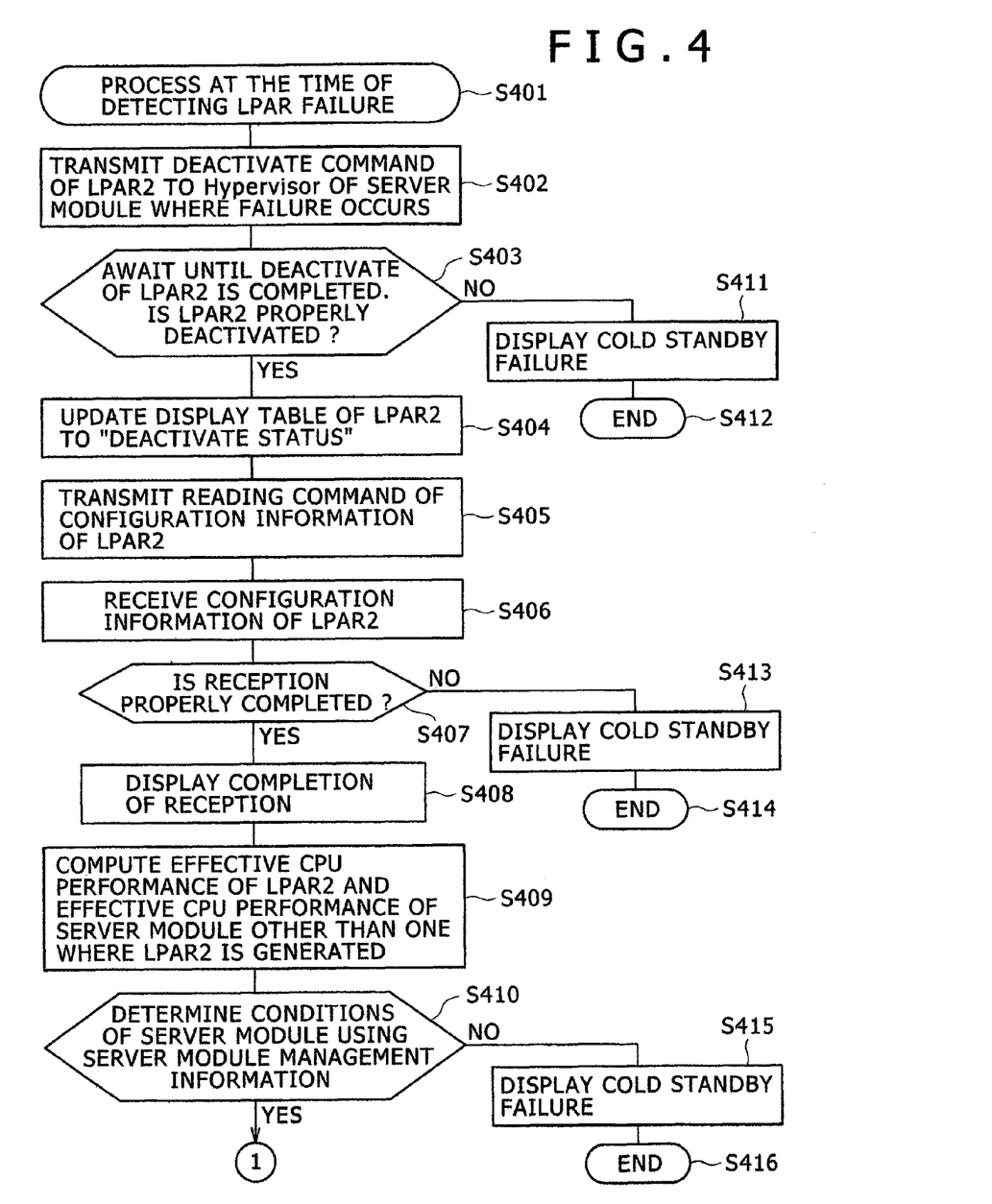
FIG. 4 is a flowchart showing a process performed by a management server when a failure occurs.
Figure 5:
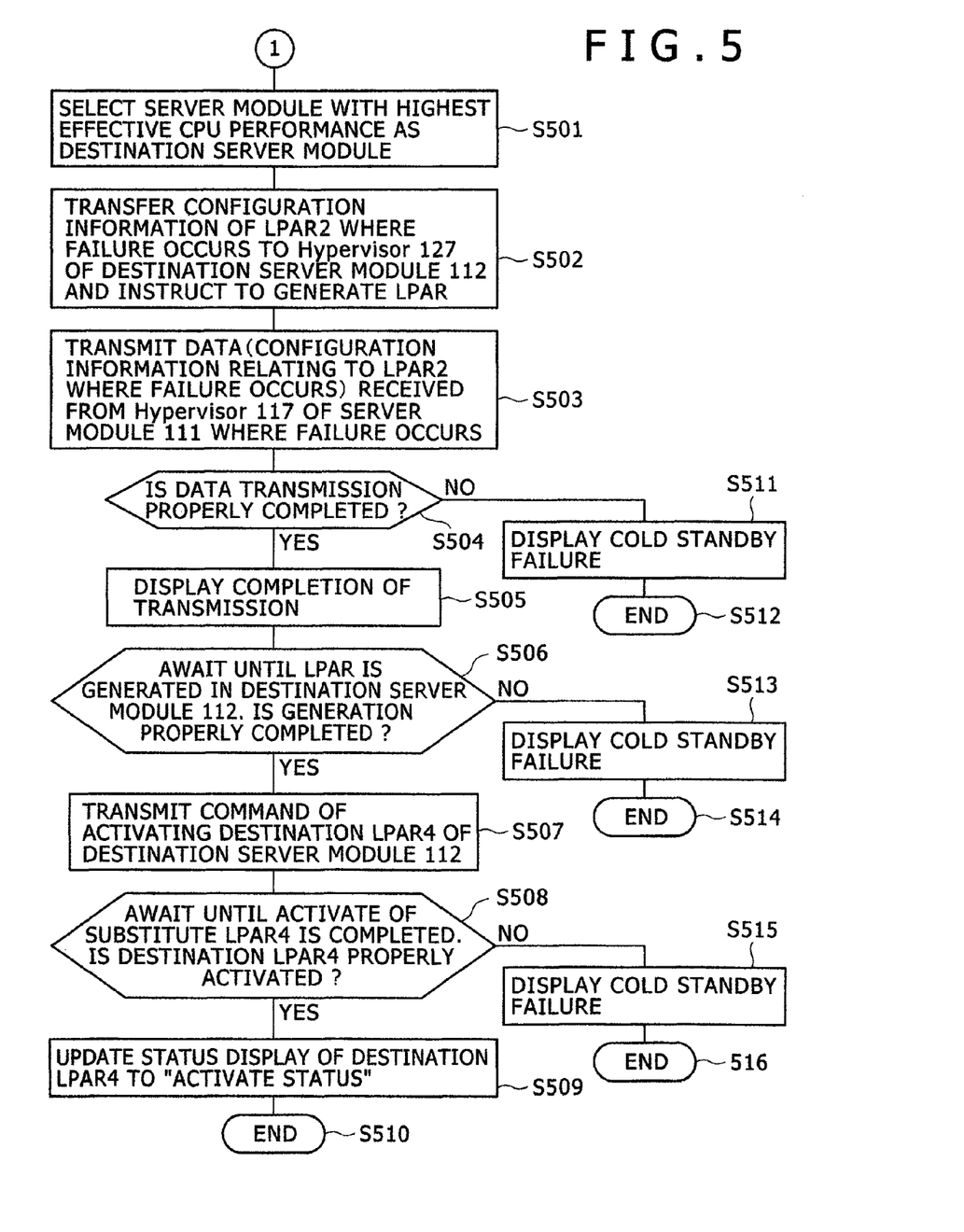
FIG. 5 is a flowchart showing a process performed by the management server when a failure occurs.

Next, a process performed by the management server 101 when a failure occurs in the LPAR2 (114) will be described with reference to FIGS. 4 and 5.

When receiving the Hypervisor-Agt alert which notifies that the failure occurs in the LPAR2 from the hypervisor 117, the management server 101 starts a process at the time of detecting the LPAR failure (S401).

First of all, the management server 101 transmits a deactivate command to the hypervisor 117 of the server module 111 in which the LPAR2 where the failure occurs is operated so as to deactivate the operation of the LPAR2 (S402). Thereafter, the management server 101 waits until the deactivate process of the LPAR2 is completed (S403). When the deactivate process is properly completed, the management server 101 updates a display table of the LPAR2 to "deactivate status" (S404). On the other hand, when the deactivate process is not properly completed, the management server 101 displays a cold standby failure (S411), and terminates the process (S412).

When the display table of the LPAR2 is updated to "deactivate status" (S404), the management server 101 transmits the configuration information reading command of the LPAR2 (S405). When receiving the configuration information of the LPAR2 (S406) and properly completing the reception (S407), the management server 101 displays the completion of reception (S408). On the other hand, when the reception is not properly completed, the management server 101 displays the cold standby failure (S413) and terminates the process (S414).

After the management server 101 properly completes the reception (S407) and displays the completion of reception (S408), the management server 101 computes an effective CPU performance of the LPAR2 and an effective CPU performance of the server module other than one that generates the LPAR2.

Here, the effective CPU performance of the LPAR2 is obtained by multiplying (the number of physical CPUs) by (a service ratio of the LPAR in the original server module). Further, the effective CPU performance of the server module other than one that generates the LPAR2 is obtained by multiplying (the number of physical CPUs) by (100%−(service ratios of all LPARs that are being activated)).

Next, the management server 101 determines the conditions of the server module for LPAR generation by using the server module management information 107 of the management server 101 (S410). The conditions include, for example, the following determinations such as (a) whether the server module having the same architecture as the LPAR2 is present, (b) whether the server module having an available memory equal to or larger than that of the LPAR2 is present, (c) whether the server module having an effective CPU performance equal to or higher than that of the LPAR2 is present, and (d) whether the server module having available NICs and HBAs equal to or larger in number than those used by the LPAR2.

If these four conditions are all satisfied, the management server 101 selects one server module with the highest effective CPU performance as the destination server module among the server modules that satisfy the conditions (S501). If any one of the four conditions is not satisfied, the management server 101 displays the cold standby failure (S415) and terminates the process (S416).

When the destination server module (the server module 112 in this example) which satisfies the four conditions is selected, the management server 101 transfers the configuration information relating to the LPAR2 where the failure occurs to the hypervisor 127 of the destination server module 112 and instructs to generate the LPAR (S502). The management server 101 transmits the data (configuration information relating to the LPAR2 where the failure occurs) received from the hypervisor 117 of the server module 111 where the failure occurs to the hypervisor 127 (S503). When the data transmission is properly completed (S504), the management server 101 displays the completion of transmission (S505). On the other hand, when the data transmission is not properly completed (S504), the management server 101 displays the cold standby failure (S511) and terminates the process (S512).

Thereafter, the management sever 101 waits until the LPAR is generated in the destination server module 112 (S506). The LPAR4 to be generated has the same configuration as the LPAR2 where the failure occurs. When the generation of the LPAR4 is properly completed, the management server 101 transmits a command of activating the destination LPAR4 (124) of the destination server module 112 (S507). On the other hand, when the generation of the LPAR4 is not properly completed, the management server 101 displays the cold standby failure (S513) and terminates the process (S514).

When the generation of the destination LPAR4 (124) is properly completed and the activate command is transmitted (S507), the management server 101 awaits completion of activating the destination LPAR4 (124) (S508). When the destination LPAR4 is properly activated, the management server 101 updates the status of the destination LPAR4 (124) to "activate status" (S509), and terminates the process (S510). On the other hand, when the destination LPAR4 (124) is not properly activated, the management server 101 displays the cold standby failure (S515) and terminates the process (S516).

Due to the following reasons, the above-described control allows the destination LPAR4 (124) to be activated as a substitute for the LPAR2 (114) where the failure occurs. An access to the storage apparatus is controlled by using a WWN. The WWN is assigned to each port of the physical devices. However, the logical HBA is provided for each LPAR and the WWN is assigned to each port of the logical HBAs in the embodiment. The WWN of the logical HBA is hereinafter called vfcWWN. As described in FIG. 1, the connection relation between the LUNs and WWNs is set by the LUN security function. Since the logical WWN is not distinguished from the physical WWN from the storage apparatus side, it is possible to manage the access right to the LU on an LPAR basis (when the vfcWWN is used, the WWN of the physical device is set so as not to be recognized from the storage apparatus). By booting the destination LPAR using the same vfcWWN as that used by the LPAR where the failure occurs, the same system as that in the original server can be started.

Figure 6:
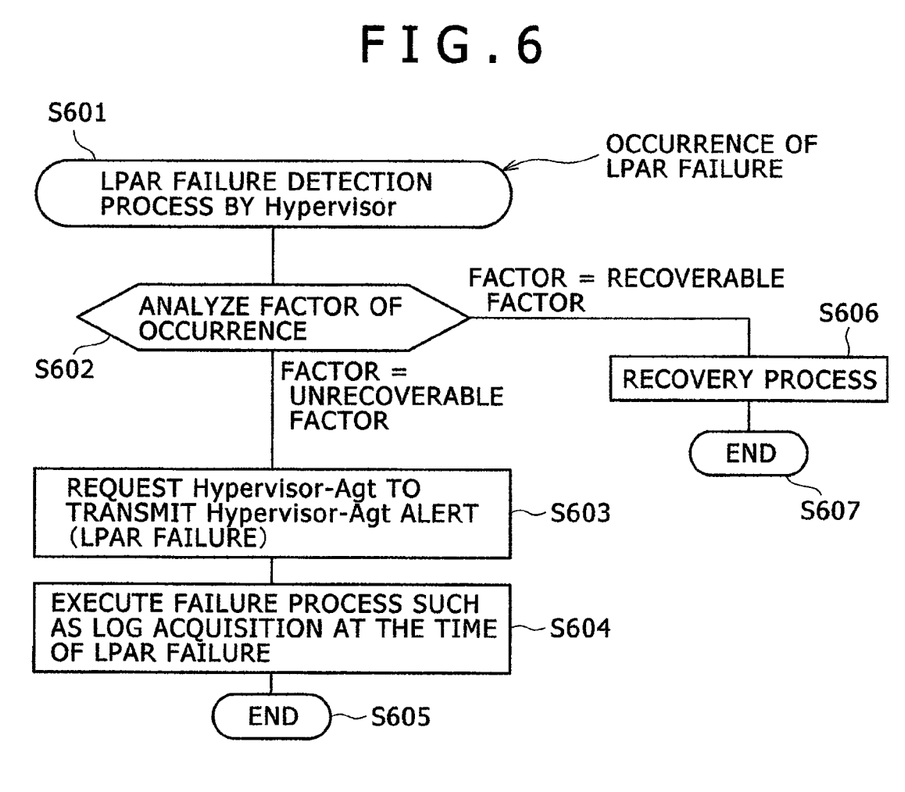
FIG. 6 is a flowchart showing a process performed by a hypervisor when a failure occurs.

Next, a process performed by the hypervisor when a failure occurs in the LPAR2 will be described with reference to FIG. 6.

When a failure occurs in the LPAR2, the hypervisor 117 starts an LPAR failure detection process (S601). In the failure detection process, the hypervisor 117 analyzes a factor of the failure occurrence to determine whether or not the factor is recoverable (S602). If the result of the determination shows that the LPAR failure is caused by an unrecoverable factor, the hypervisor 117 requests transmission of the Hypervisor-Agt alert to notify the Hypervisor-Agt (118) of the LPAR failure (S603), executes a failure process such as log acquisition at the time of LPAR failure (S604), and terminates the process (S605).

On the other hand, when the LPAR failure is caused by a recoverable factor, the hypervisor 117 performs a recovery process (S606) and terminates the process (S607).

Figure 7:
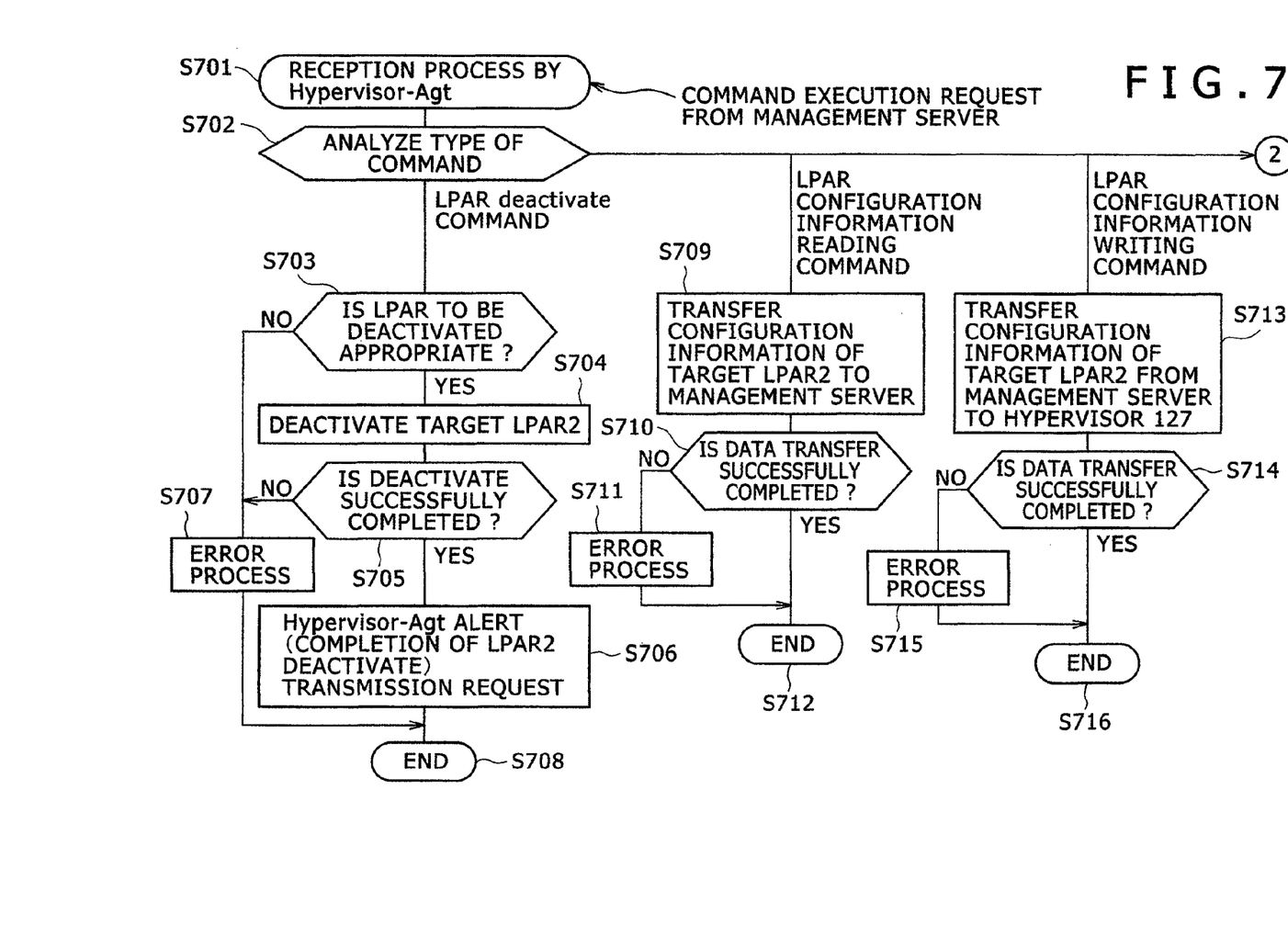
FIG. 7 is a flowchart showing a process of a command in a Hypervisor-Agt.
Figure 8:
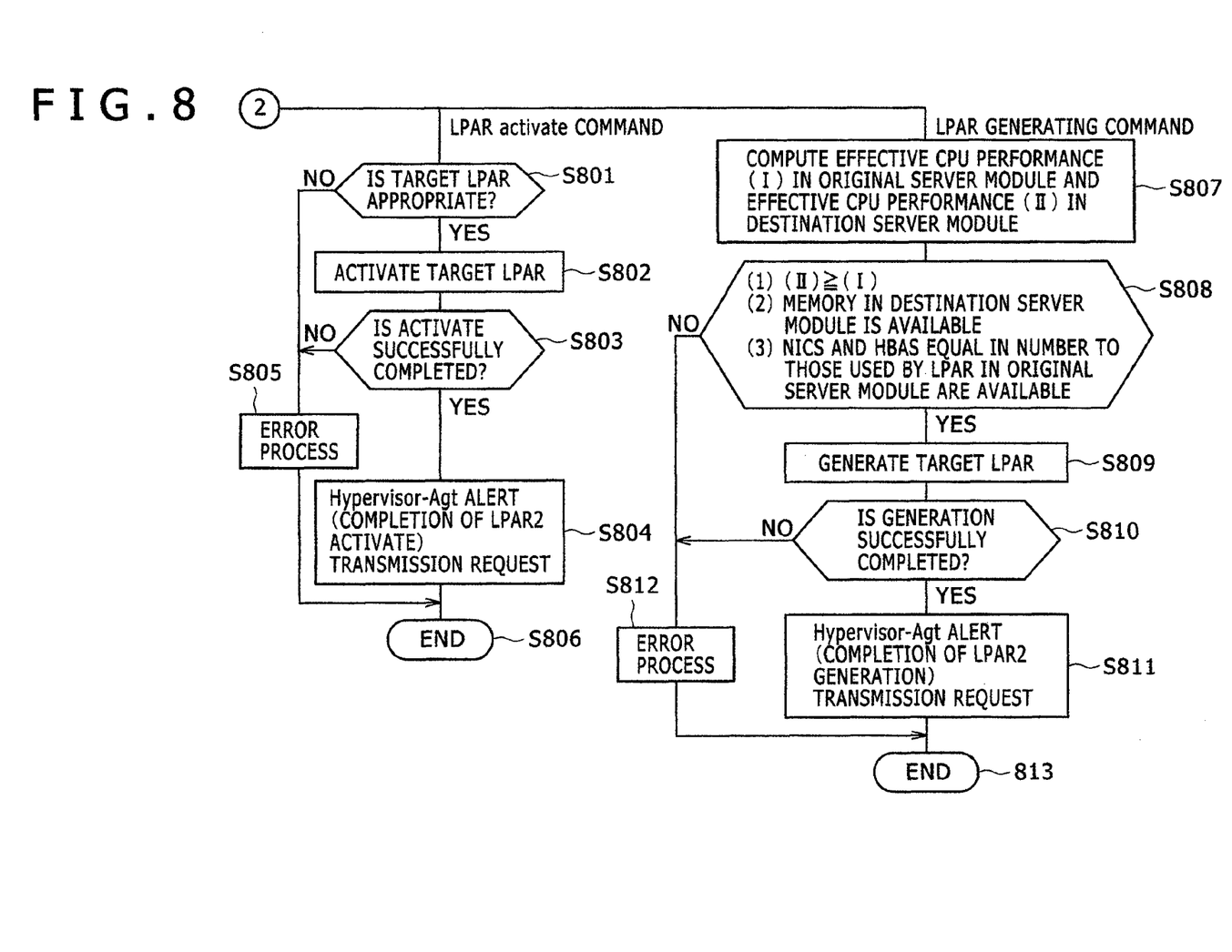
FIG. 8 is a flowchart showing a process of a command in the Hypervisor-Agt.

Next, a command process in the Hypervisor-Agt (118) accompanied by a command execution request from the management server 101 will be described with reference to FIGS. 7 and 8.

When receiving the command execution request transmitted from the management server 101, the Hypervisor-Agt (118) performs a reception process (S701). Since there are many kinds of commands to be requested, the Hypervisor-Agt (118) analyzes the types of the commands in the first place (S702). In this example, the Hypervisor-Agt (118) performs a process of five commands of an LPAR deactivate command for deactivating the LPAR, an LPAR configuration information reading command, an LPAR configuration information writing command, an LPAR activate command for activating the LPAR, and an LPAR generating command.

In the case of the LPAR deactivate command, it is determined whether the LPAR to be deactivated is appropriate (S703). When it is determined that the LPAR is not appropriate, an error process is performed (S707), and the process is terminated (S708). When it is determined that the LPAR2 to be deactivated is appropriate, a process for deactivating the target LPAR2 is performed (S704). Then, it is determined whether or not the deactivate process is successfully completed (S705). When the deactivate process fails, an error process is performed (S707), and the process is terminated (S708). On the other hand, when the deactivate process is successfully completed, transmission of the Hypervisor-Agt alert is requested to notify the completion of deactivate of the LPAR2, and the process is terminated (S708).

In the case of the LPAR configuration information reading command, the configuration information of the target LPAR2 is transferred to the management server 101. Thereafter, it is determined whether or not the data transfer is successfully completed (S710). When the data transfer is successfully completed, the process is terminated (S712). On the other hand, when the data transfer fails, an error process is performed (S711), and the process is terminated (S712).

In the case of the LPAR configuration information writing command, the configuration information of the target LPAR2 is transferred from the management server 101 to the hypervisor 127. Thereafter, it is determined whether or not the data transfer is successfully completed (S714). When the data transfer is successfully completed, the process is terminated (S716). On the other hand, when the data transfer fails, an error process is performed (S714), and the process is terminated (S716).

Next, in the case of the LPAR activate command (see FIG. 8), it is determined whether the LPAR to be activated is appropriate (S801). When the result shows that the LPAR is not appropriate, an error process is performed (S805), and the process is terminated (S806). On the other hand, when it is determined that the LPAR2 to be activated is appropriate, a process for activating the target LPAR2 is performed (S802). Then, it is determined whether the activate is successfully completed (S803). When the activate process fails, an error process is performed (S805), and the process is terminated (S806).

On the other hand, when the activate process is successfully completed, transmission of the Hypervisor-Agt alert is requested to notify the completion of activate of the LPAR (S804), and the process is terminated (S806).

Next, in the case of the LPAR generating command, the effective CPU performances in the original and destination server modules are computed (S807). The effective CPU performance in the original server module is obtained by multiplying (the number of physical CPUs) by (the service ratio of the LPAR in the original server module). The effective CPU performance in the destination server module is computed by multiplying (the number of physical CPUs) by (100%−(service ratios of all LPARs that are being activated)).

Thereafter, there are determined the following three conditions (S808), such as (1) the effective CPU performance in the destination server module is equal to or higher than that in the original server module by comparing the effective CPU performances with each other, (2) a memory in the destination server module is available, and (3) the NICs and HBAs equal to or larger in number than those used by the LPAR in the original server module are available in the destination server module.

When any one of the three conditions is not satisfied, it is determined that it is impossible to generate the LPAR. Then, an error process is performed (S812), and the process is terminated (S813).

On the other hand, when the three conditions are all satisfied, the target LPAR is generated (S809). In this example, the LPAR4 (124) is generated as a substitute for the LPAR2.

Thereafter, it is determined whether or not the generation of the LPAR is successfully completed (S810). When the generation of the LPAR is successfully completed, transmission of the Hypervisor-Agt alert is requested to notify the completion of LPAR generation (S811), and the process is terminated (S813). On the other hand, when the generation of the LPAR fails, an error process is performed (S812), and the process is terminated (S813).

Figure 9:
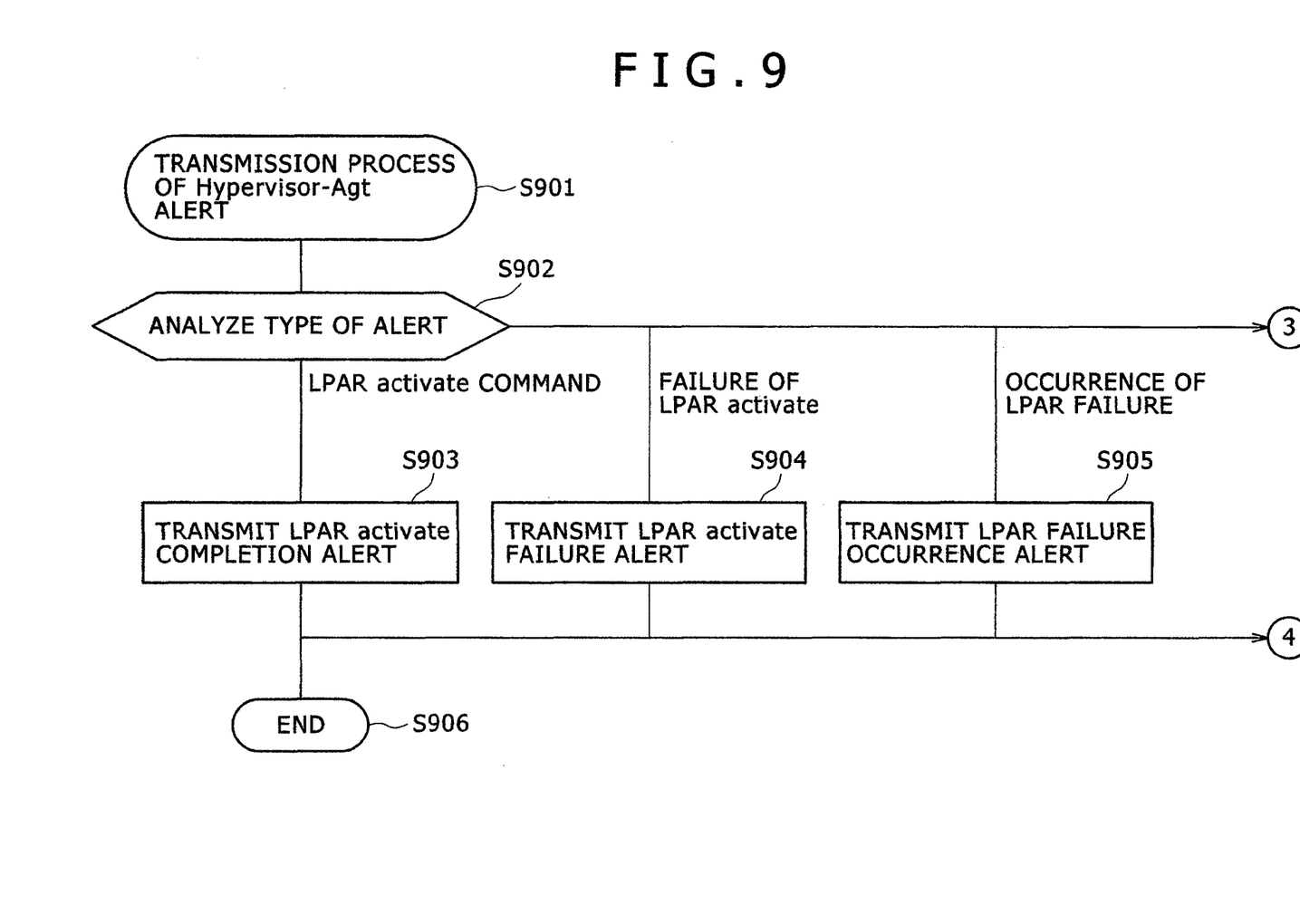
FIG. 9 is a flowchart showing a transmission process performed by the Hypervisor-Agt.
Figure 10:
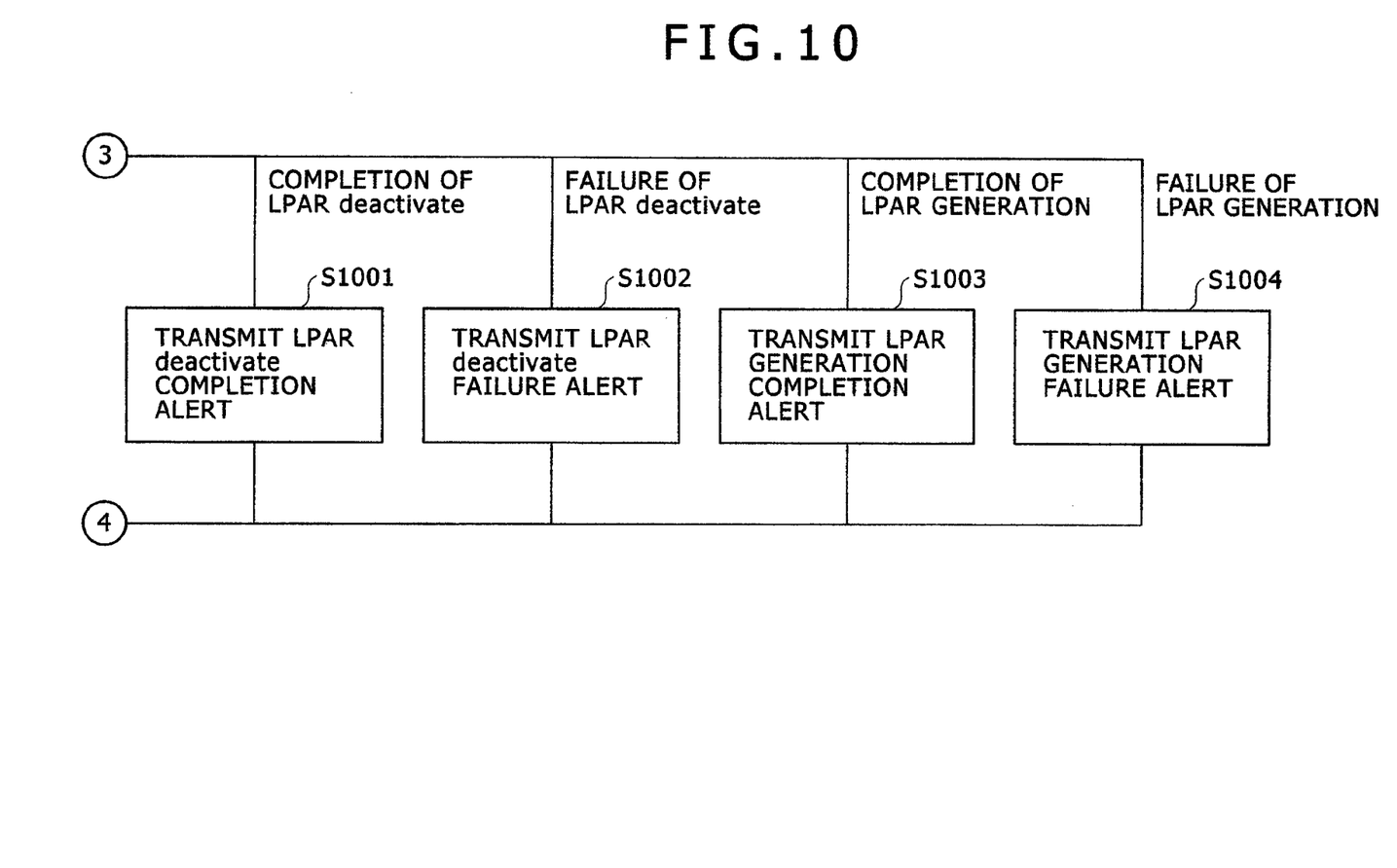
FIG. 10 is a flowchart showing a transmission process performed by the Hypervisor-Agt.

Next, a transmission process performed by the Hypervisor-Agt when transmission of the hypervisor alert is requested will be described with reference to FIGS. 9 and 10.

When the transmission of the Hypervisor-Agt alert is requested, the Hypervisor-Agt (118) analyzes the type of the alert (S902).

The result shows that the alert type is the completion of LPAR activate, an LPAR activate completion alert is transmitted (S903), and the process is terminated (S906).

The result shows that the alert type is the failure of LPAR activate, an LPAR activate failure alert is transmitted (S904), and the process is terminated (S906).

The result shows that the alert type is the occurrence of LPAR failure, an LPAR failure occurrence alert is transmitted (S905), and the process is terminated (S906).

The result shows that the alert type is the completion of LPAR deactivate, an LPAR deactivate completion alert is transmitted (S1001), and the process is terminated (S906).

The result shows that the alert type is the failure of LPAR deactivate, an LPAR deactivate failure alert is transmitted (S1002), and the process is terminated (S906).

The result shows that the alert type is the completion of LPAR generation, an LPAR generation completion alert is transmitted (S1003), and the process is terminated (S906).

The result shows that the alert type is the failure of LPAR generation, an LPAR generation failure alert is transmitted (S1004), and the process is terminated (S906).

In the above-described example, when a failure occurs in the LPAR of the server 111, the LPAR is migrated to another while transmitting and receiving various information between the hypervisors in the original and destination server modules under the control of the management server 101.

Further, the failure of the server can be detected from the SVP. Accordingly, even at the time of hardware failure, the LPARs operated on the hardware can be migrated to different physical devices.

As described above, according to the embodiment, when an LPAR failure occurs in the virtual computer system, the LPAR can be migrated to another while migrating detailed information. Accordingly, the embodiment can be applied to an operation using the virtual computer system in which efficiency is required. Further, when plural physical computers vary in performance, it is possible to easily migrate a specific LPAR among the physical computers.

What is claimed is:

1. A virtual computer system comprising:
a plurality of physical computers including first and second physical computers, the plurality of physical computers having logical partitions generated thereon and the first physical computer having a first logical partition; and
a management apparatus that is connected to the plurality of physical computers via a network to manage the physical computers and logical partitions, and allows operating systems (OSs) to operate by generating the logical partitions on the physical computers,
wherein the first physical computer includes:
a first physical Host Bus Adapter (HBA);
failure detection means for detecting a failure occurrence in the first physical computer or the first logical partition; and
first management means for managing I/O configuration information of the first logical partition and a vfcWWN as a World Wide Name assigned to a logical HBA configured in the first logical partition,
wherein the management apparatus includes:
means for accepting notification of the failure occurrence from the failure detection means and for receiving the I/O configuration information of the first logical partition and the vfcWWN from the first management means; and
means for determining the second physical computer substituting for the first physical computer and to transmit the I/O configuration information of the first logical partition and the vfcWWN to the second physical computer, and
wherein the second physical computer includes:
a second physical HBA;
means for receiving the I/O configuration information of the first logical partition and the vfcWWN transmitted from the management apparatus;
means for determining whether or not a second logical partition can be generated on the second physical computer on the basis of the I/O configuration information of the first logical partition; and
means for generating the second logical partition on the basis of the vfcWWN when the means for determining determines that the second logical partition can be generated;
wherein the I/O configuration information of the first logical partition includes information of the first physical HBA, and
wherein said means for generating configures a logical HBA in the second logical partition to which the vfcWWN is assigned.

2. The virtual computer system according to claim 1,
wherein the first physical computer includes means for deactivating the operation of the first logical partition and to notify the management apparatus of the deactivation of the first logical partition after a failure is detected,
the second physical computer includes means for transmitting, when the generation of the second logical partition is completed, notification of the completion of the generation of the second logical partition to the management apparatus,
the management apparatus includes means for displaying a deactivated status of the first logical partition when receiving the notification deactivation of the first logical partition and means for transmitting an activation command to the second logical partition to the second physical computer after receiving the notification of the completion of the generation of the second logical partition, and the second physical computer activates the second logical partition when receiving the activation command.

3. The virtual computer system according to claim 1,
wherein the means for determining, of the second phycical computer, computes effective CPU performances of the first physical computer and the second physical computer,
wherein the effective CPU performance of the first physical computer is computed by multiplying (the number of physical CPUs) by (the service ratio of the first logical partition), and
wherein the effective CPU performance of the second physical computer is computed by multiplying (the number of physical CPUs) by (100% - (the service ratios of all logical lpartitions that are being activated on the second physical computer)).

4. The virtual computer system according to claim 3,
wherein the means for determining determines whether or not the second logical partition can be generated by checking whether the effective CPU performance of the second physical computer is equal to or higher than that of the first physical computer)).

5. The virtual computer system according to claim 1,
wherein the means for determining determines whether or not the second logical partition can be generated by checking whether a memory of the second physical computer has sufficient capacity.

6. The virtual computer system according to claim 1,
wherein the means for determining determines whether or not the second logical partition in the second physical computer can be generated by checking whether a number of the first physical HBA included in the I/O configuration information of the first logical partition are available in the second physical HBA.

7. The virtual computer system according to claim 1,
wherein the respective means included in the first and second physical computers are provided in hypervisors which manage the first and second logical partitions.

8. A control method of migrating logical partitions in a virtual computer system having a plurality of physical computers including first and second physical computers and a management apparatus that is connected to the plurality of physical computers via a network to manage the physical computers and the logical partitions on the physical computers, the method comprising:
in the first physical computer detecting a failure occurrence in the first physical computer or a first logical partition formed in the first physical computer;
in the first physical computer managing I/O configuration information of the first logical partition and a vfcWWN as a World Wide Name assigned to a logical HBA configured in the first logical partition;
in the management apparatus accepting notification of the failure occurrence from the failure detection step and receiving the I/O configuration information of the first logical partition and the vfcWWN transmitted from the first physical computer;
in the management apparatus determining the second physical computer substituting for the first physical computer and transmitting the I/O configuration information of the first logical partition and the vfcWWN to the second physical computer;
in the second physical computer receiving the I/O configuration information of the first logical partition and the vfcWWN transmitted from the management apparatus;
in the second physical computer determining whether or not a second logical partition can be generated on the second physical computer on the basis of the I/O configuration information of the first logical partition; and
generating the second logical partition on the basis of the vfcWWN when it is determined in the determination step that the second logical partition can be generated;
wherein a logical HBA is configured in the second logical partition in said generating step and the vfcWWN is assigned to the logical HBA in the second logical partition.

* * * * *